United States Patent [19]

Haught et al.

[11] 3,755,073

[45] Aug. 28, 1973

[54] HYBRID LASER PLASMA TARGET - NEUTRAL BEAM INJECTION FUSION SYSTEM

[75] Inventors: Alan F. Haught; Donald H. Polk, both of Glastonbury; James C. Woo, Andover; Walter J. Fader, Glastonbury, all of Conn.

[73] Assignee: The United States of America as represented by the United States Atomic Energy Commission, Washington, D.C.

[22] Filed: June 21, 1971

[21] Appl. No.: 155,012

[52] U.S. Cl. ............................. 176/1, 176/5, 176/9
[51] Int. Cl. ............................................. G21b 1/02
[58] Field of Search ................. 176/1, 2, 5, 3, 4, 176/7

[56] References Cited
UNITED STATES PATENTS

| 3,624,240 | 11/1971 | Damn et al. | 176/7 |
| 3,582,849 | 6/1971 | Post et al. | 176/5 |
| 3,030,543 | 4/1962 | Luce | 176/5 |
| 3,218,235 | 11/1965 | Ehler | 176/5 |
| 3,489,645 | 1/1970 | Daiber et al. | 176/1 |
| 3,094,474 | 6/1963 | Gale | 176/1 |
| 3,361,634 | 1/1968 | Smullin | 176/5 |

OTHER PUBLICATIONS

CN-24/F-7, Plasma Physics and Controlled Nuclear Fusion Research, Vol. 1, Conf. Proc. Novosibirsh, 1–7 Aug. 1968

*Primary Examiner*—Harvey E. Behrend
*Attorney*—Roland A. Anderson

[57] ABSTRACT

This invention relates to a method for creating a high density plasma by heating in a vacuum a pellet located within a magnetic field to produce a dense, magnetically confined, relatively warm plasma of ions and electrons, and injecting thereinto an energetic neutral beam to form a high temperature, stable, magnetically confined, steady-state plasma.

14 Claims, 9 Drawing Figures

INVENTORS.

Alan F. Haught
Donald H. Polk
James C. Woo
Walter J. Fader

INVENTORS.
Alan F. Haught
Donald H. Polk
James C. Woo
Walter J. Fader

INVENTORS.
Alan F. Haught
Donald H. Polk
James C. Woo
Walter J. Fader

INVENTORS.
Alan F. Haught
Donald H. Polk
James C. Woo
Walter J. Fader

HYBRID LASER PLASMA TARGET - NEUTRAL BEAM INJECTION FUSION SYSTEM

This invention was made in the course of or under a contract with the United States Atomic Energy Commission.

BACKGROUND OF THE INVENTION

In the field of fusion a need exists for long-lived, high temperature, dense plasmas. Such plasmas are useful in providing an environment for the controlled release of energy in nuclear fusion reactions, as well as for research on the properties of plasmas, their interaction with various magnetic field configurations, and their containment within stellarators, tokamaks and/or any closed or open-ended research reactors known in the art.

In the prior art, plasmas have been produced by various means, each involving drawbacks which limit the applicability of the technique and/or the life-time of the resulting plasma. One concept involves the injection of a beam of atoms into an evacuated region within a magnetic containment field wherein Lorentz ionization buildup to a high density takes place, after which interaction between the beam and the plasma serves to sustain the plasma against decay. This system, which is called ALICE for adiabatic low-energy injection and capture experiment, involves the injection of a beam of neutral atoms of 10 to 20 keV energy into a magnetic mirror, as described on page 401 et seq. of "Controlled Thermonuclear Reactions" by Glasstone and Lovberg, Van Nostrand, 1960. Another concept that involves plasma buildup to a high density employs an arc discharge to induce breakup of a molecular ion beam. This system, which is called DCX, is based upon the injection of high-energy deuterons into a magnetic mirror configuration by disassociation of molecular deuterium ($D_2+$) ions in an arc, as described on page 395 et seg. of the above-mentioned Glasstone et al publication and page 405 of "Plasmas and Controlled Fusion", BY Rose and Clark, MIT, 1961. In still another concept, which is known as 2X, the desired plasma density is created by magnetic capture of a plasma injected from the outside followed by magnetic compression.

Significant limitations exist to the plasmas produced in the manner known to the prior art. The process of Lorentz ionization is inefficient in the utilization and capture of beam particles, and buildup to a plasma density sufficient for effective interaction between the beam and the captured plasma has not been achieved. The arc used in the DCX experiments contributes a large flux of neutral particles into the containment volume, and instabilities encountered at low captured plasma densities have limited the plasma to the low density, collisionless regime. Capture of the plasma in 2X requires a time varied magnetic field, a technique which is not generally applicable to the variety of research reactors known to the art.

The present invention overcomes the disadvantages of the prior art, and provides a new and unique method for creating a dense plasma which will have great utility in nuclear fusion research reactors and may be applicable for full scale reactor systems. The present invention provides a means for creating an initially dense, collisional plasma in which the development of microinstabilities is suppressed and whose density is large enough for efficient utilization of the beam by interaction with the ions and electrons of the confined plasma. The plasma provided by this invention can be generated in either time varying or steady-state magnetic containment fields and may be used in toroidal or open-ended magnetic field geometries.

SUMMARY OF THE INVENTION

The concept of the present invention involves the injection of an energetic neutral beam into a high density, magnetically confined, relatively warm target plasma to build up the plasma temperature and to sustain the plasma density against decay in a high temperature, stable, magnetically confined, steady state.

The high density, collisional target plasma is produced in a vacuum by ionizing and heating a pellet of matter which expands in, is captured by, and is contained within a magnetic confinement field. In a preferred embodiment, the heating is performed by an intense laser beam focused onto the particle, but other energetic beams such as electron beams may be used. Initially the ratio of the energy density of the laser produced plasma to that of the magnetic field, known to those skilled in the art and hereinafter referred to as $\beta$, is large compared with unity, and the plasma expands in response to its internal pressure forces. As the expanding plasma is decelerated and captured, the expansion velocities of its constituent particles are randomized, which establishes an equilibrium Maxwellian velocity distribution within the captured plamsa and may contribute to its observed stable capture. The captured plasma is subsequently permeated by the magnetic containment field to produce a magnetically confined, warm plasma at $\beta \leq 1$. The density of the captured and magnetically confined plasma depends on the magnetic field strength and, in particular, can exceed $1 \times 10^{12}$ cm$^{-3}$, the threshold density for effective beam-plasma interaction.

Upon injection of an energetic neutral beam onto the target plasma, the plasma is heated by charge exchange and sustained by ionization of the injected atomic beam on the high density target plasma to form a high temperature, stable, magnetically confined, steady-state plasma. During the charge exchange and ionization processes, the constituent ions of the laser produced target plasma may be replaced from the beam by ions of the same or different species than the original laser produced plasma to produce any desired composition in the steady-state plasma. In general it may also be advantageous to inject a neutral beam having a velocity distribution function which is not an equilibrium Maxwellian or loss cone distribution at the steady-state plasma temperature. The magnetically confined, warm target plasma can be sufficiently collisional due to its high density that the relatively narrow velocity distribution function of the injected neutral beam is thermalized over the plasma velocity distribution function, which may inhibit the development of destructive instabilities in the plasma.

The above and further novel features and objects of this invention will become apparent from the following description of a preferred embodiment of this invention.

BRIEF DESCRIPTION OF THE DRAWING

In the drawings, where like elements are referenced alike.

DESCRIPTION OF THE PREFERRED EMBODIMENT

It is known in the prior art that a beam of atoms and-/or molecules can be injected into and ionized within a magnetic containment field to form a confined plasma. At low confined plasma densities, ionization of the injected beam by interaction with the confined plasma is insufficient to maintain the plasma against decay, and the plasma density is determined by the balance between the rate of decay and the beam ionization rate by some other process (e.g., Lorentz ionization). Above a critical density, which depends inversely on the injection beam current, the ionization of the beam is dominated by the interaction of the beam with the contained plasma, and the confined plasma density increases to an equilibrium value at which the beam ionization is balanced by the plasma loss rate. This behavior is described by an S curve relation between the zeros of the time derivative of the contained plasma density and the beam injection current. It is also known in the prior art that a magnetically confined high temperature plasma may be produced by irradiating with a focused energy source an isolated quantity of material in vacuum within a magnetic containment field which captures and confines the resulting expanding plasma. The captured plasma gradually decays as a result of plasma losses.

The present invention expands the teachings of the prior art by showing that a high density, magnetically confined, relatively warm, slowly decaying plasma such as produced by laser irradiation in a vaccum of a pellet, may be used as a target for neutral beam injection to produce a high temperature, stable, magnetically confined, steady-state plasma.

Figure 1:
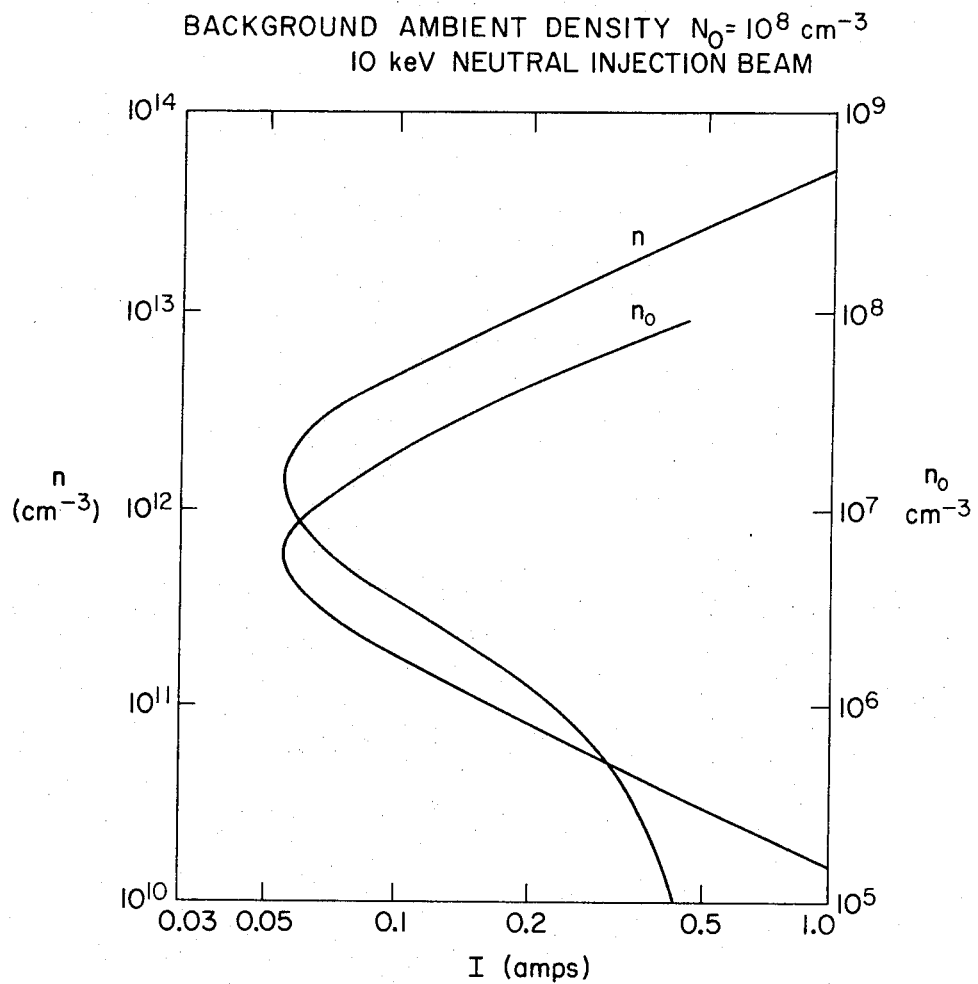
FIG. 1 is a graphic illustration of a neutral beam injection current I vs. target plasma density n and background neutral density $n_o$ for a background ambient gas density $N_o$.

The known S curve behavior for the interaction of an injected beam of equivalent current I with a plasma of density n in a background ambient gas of density $N_o$ is displayed in FIG. 1 in which are shown curves for the equilibrium ion density n and background neutral density $n_o$ inside the plasma. For a particular value of $N_o$, the densities $n$ and $n_o$ are double-valued functions of the neutral beam current I corresponding to stable and unstable equilibrium values.

The upper branch of the ion density represents states of equilibruim with plasma losses balanced by ionization of the neutral beam. For a given neutral beam current I, when the initial value of n lies above the upper branch of the ion density curve, the time derivative of n is negative, and the plasma density decreases to the steady state represented by the point on the upper branch corresponding to that beam current. When the initial plasma density lies between the stable equilibrium upper and unstable equilibrium lower branch, the time derivative of $n$ is positive, and the plasma density increases to the steady-state density on the upper branch for the injection beam current I. When the initial density n is below the unstable equilibrium lower branch, the time derivative of n is negative, and the plasma density decays toward zero as the plasma is destroyed by charge exchange with the background neutrals. If a process other than interaction of the beam with the plasma can also occur (e.g., Lorentz ionization as in ALICE), then at some lower density that process may be sufficient to offset the charge exchange and other plasma losses and result in a low density steady state. However, such plasmas are either at low temperature with correspondingly large collisional decay rates or are noncollisional and subject to microinstability losses, both of which effects limit the plasma density to low values with neutral beam currents available to the art. To obtain high plasma densities with a given neutral beam current such as is available to the art (the beam current must of course exceed $I_{min}$ below which only the trivial steady state $n=0$, $n_o=n_o$ exists), the initial target plasma density must exceed the value defined by the unstable equilibrium lower branch of the $n$ vs. I S curve. This is provided in the present invention by the captured, high density laser produced plasma which represents a unique means to obtain the required high target density previously unavailable to the art.

The initial high density target plasma is produced from a small particle of lithium deuteride, electrically suspended in vacuum at the focus of a lens where it is vaporized, ionized and heated by the focused, high power beam of a Q-switched laser. In this process, the electrons in the plasma are heated directly by the incident radiation, and ion heating occurs by subsequent electron-ion energy transfer collisions. As a result of the small Debye length and short collision times within the plasma, the plasma acts as a continuum fluid and expands into the surrounding vacuum in response to internal pressure forces. This expansion lowers the plasma density, decreasing the plasma absorption coefficient, and eventually terminates the heating of the plasma by the laser beam. Upon further expansion, the plasma thermal energy is essentially all transformed into radial expansion kinetic energy, and the result is a highly ionized, spherically expanding ball of plasma.

Figure 2:
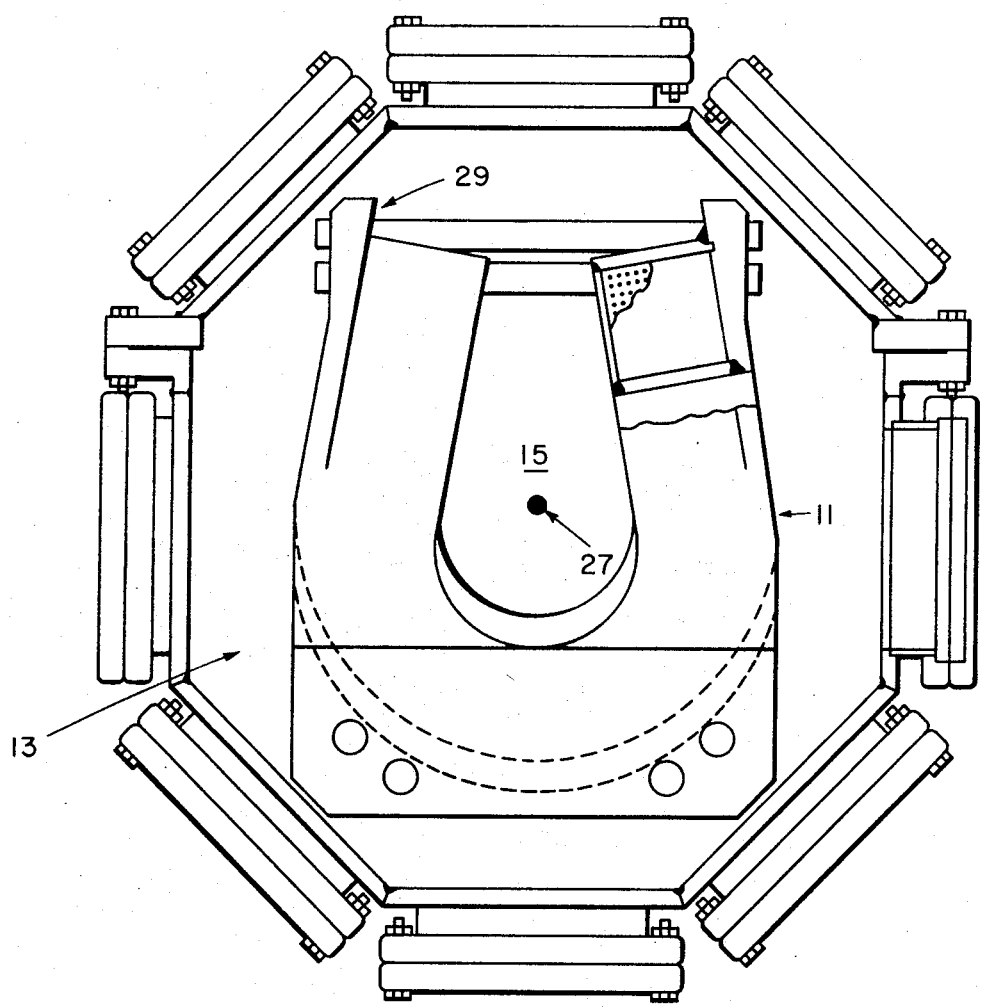
FIG. 2 is a partial cross section of one embodiment of apparatus for producing the laser produced target plasma of FIG. 1.
Figure 3:
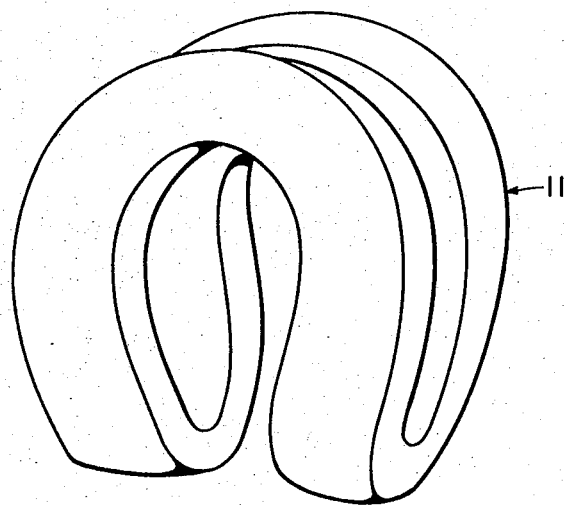
FIG. 3 is a schematic three-dimensional view of the magnet coil of the apparatus of FIG. 2.

One magnetic field configuration for capture and confinement of the expanding laser produced plasma to form the warm, dense plasma target plasma of this invention is shown in FIG. 2. A minimum-B mirror magnetic field is produced by a winding 11 formed in a baseball seam shaped configuration as shown further in a three-dimensional schematic in FIG. 3. It will be apparent to those skilled in the art that other winding configurations may also be used. In one embodiment, the winding is energized by a dc current, the current being a constant dc current in either a superconductor winding or a normal resistance conductor which might advantageously by cryogenically cooled to lower its resistance. The winding of this or other embodiments that might be used provides the strong magnetic containment field 15 within which the plasma capture and containment takes place. In the preferred embodiment described here, the magnetic field is constant in time which advantageously permits the use of superconductor magnets in a full scale operating reactor system. As should be evident to one skilled in the art, the invention could alternatively employ a magnetic field which varies with time.

Referring also to FIG. 2, the lithium deuteride pellet 27 is suspended within the magnetic containment field 15 inside vacuum chamber 13. The pellet initially has a density of at least $1 \times 10^{20}$ particles/cm$^3$. Any other liquid or solid material such as cooled deuterium or tritium alone or together; or a material with a high atomic weight, i.e., higher Z materials, might also be used.

The pellet 27 is projected into the suspension region by a spring wire or other well-known means. The pellet is charged electrostatically by a suitable source, not shown, which can be a heated filament or other electron source as known in the art. The electrostatically charged pellet 27 is suspended in a low pressure vacuum in the chamber 13 by suitable suspension electrodes. Other suspension or injection systems may be used such as taught in U. S. Pat. No. 3,378,446.

Figure 4:
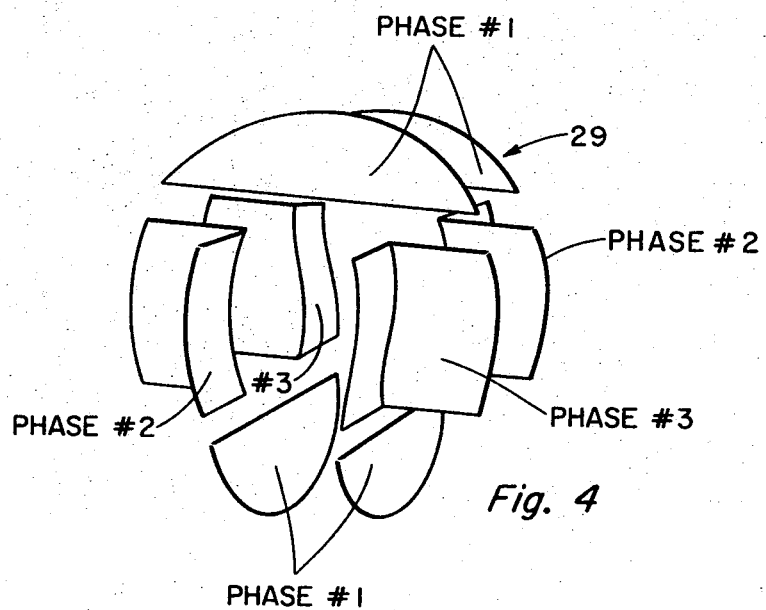
FIG. 4 is a schematic three-dimensional view of a suspension electrode assembly for the pellet of FIG. 2.

In one embodiment, shown in FIG. 4, the suspension electrodes basically comprise a set of six oppositely arranged plates which form a cubical array and advantageously may be contoured to fit the inside of the containment magnetic field coil. By connecting phases 1, 2 and 3 respectively of a variable high frequency (e.g., 10 to 400 Hz) three-phase source to the electrodes 29 as illustrated by the phase reference numbers in FIG. 4, pellet 27 is suspended in a small stationary orbit at the center of vacuum chamber 13, and at the center of the field 15 produced by winding 11. It will be understood, however, that other suspension systems may also be substituted along with other configurations of field 15 such as those described above, and that the particle may be advantageously suspended at a point other than the magnetic field or chamber center or axis of symmetry.

The magnetic containment field parameters for any specific embodiment involve a compromise in order to produce maximum steady-state confined plasma density within the constraints imposed by the size of the vacuum chamber and the properties of the magnetic field power source. For an open-ended mirror magnetic field as considered in the preferred embodiment discussed here, in general, particle orbit nonadiabaticity losses, which limit the maximum temperature steady-state plasma that can be contained within the confinement field, are smallest, for a given field size, for small values of the magnetic field mirror ratio. Reduction of the Coulomb losses, however, requires both high plasma temperatures and large mirror ratio, and a compromise mirror ratio must be chosen to minimize the total plasma loss rate from both effects. Similarly, while both high magnetic field strength and long field length are desirable, the power supply voltage and current and conductor resistivity limit the total field energy which can be maintained. Such compromise conditions are required for optimum operation of any experimental research reactor or full scale operating reactor system and in no way imply a conceptual limitation of the invention.

Initially the internal pressure of the dense laser produced plasma is much greater than the pressure exerted on the plasma by the magnetic containment field within which it is produced, and the plasma becomes a radially expanding, highly ionized ball of plasma. Upon expansion, the plasma temperature and density, and consequently the internal plasma pressure, are reduced. When the plasma pressure decreases below that of the magnetic field, the plasma expansion is slowed and subsequently the plasma transverse motion is stopped by the magnetic field. The initial expansion before the plasma is decelerated and stopped is sufficiently rapid and the plasma conductivity in the interaction region is sufficiently high that the magnetic field is initially excluded from the trapped plasma volume. Before the magnetic field diffuses into the plasma, the plasma volume is virtually field free, and the plasma particles are constrained by the charge separation sheath established at the plasma-magnetic field interface. The ion energy distribution in the initially expanding plasma is such that, upon randomization of the expansion motion (for example, upon reflection in the sheath) a Maxwellian distribution is obtained, a fact which may contribute to the stable behavior of the magnetically confined plasma observed experimentally. However, for a high energy laser produced plasma, and consequently a high temperature trapped plasma upon capture, before the magnetic field has diffused into the plasma, the plasma can effuse through the holes formed by the sheath at the end cusps of the open-ended minimum-B magnetic containment field and be lost from the system. Balancing the effusion loss time against the rate of field diffusion into the plasma establishes a maximum temperature for effective plasma capture. For temperatures below this maximum, field diffusion occurs before substantial effusion loss has occurred, and a significant fraction of the laser plasma is mirror confined by the magnetic containment field. At higher temperatures, the effusion loss depletes the captured plasma, and little remains to be mirror confined.

Calculation of the maximum temperature for effective plasma capture for a variety of magnetic field embodiments known to the art gives substantially less than the ignition temperature of a deuterium-tritium or other fusion plasma except for extreme conditions not available to the art. The required additional heating of the captured plasma is provided in the present invention by the high energy injected neutral beam. To assure effective magnetic field capture, the laser produced target plasma is formed at a temperature below the maximum evaluated for the specific magnetic field configuration used.

Subsequent to the initial plasma trapping, the excluded magnetic field diffuses into the region occuppied by the finite conductivity laser produced plamsa, and the plasma containment changes from a high-$\beta$ trapping to low-$\beta$ mirror confinement. During this process, the plasma axial spread remains substantially constant but the plasma radial extent increases due to interpenetration of the laser produced plasma and the magnetic field, and to the finite ion Larmor orbit radius of the mirror trapped ions. Still later, cross-field diffusion of the laser produced plasma occurs at a rate determined by the density decay and temperature of the plasma. Upon mirror confinement the plasma decays by Coulomb collisional scattering into the magnetic field mirror loss cones. For the lithium hydride plasma generated in the embodiment described in detail here, the Coulomb scattering leads to preferential loss of more highly ionized lithium ions, and the decaying LiD plasma rapidly evolves to a deuterium plasma.

Injection of an energetic neutral beam into the high density, laser produced, magnetically confined warm plasma, results in charge exchange collisions between the energetic beam particles and the plasma which serve to replace the moderate energy ions of the laser produced plasma with the high energy particles from the injected beam. The energy dependence of the Coulomb decay and the charge exchange process act to heat the contained plasma to a temperature determined by the injected beam energy. This reduces the Coulomb loss rate and, depending on the configuration and intensity of the magnetic field, introduces a nonadiabaticity loss for the high energy ions of the plasma. For an initial target plasma density in excess of that given by the lower branch curve of FIG. 1 for the injected beam current ($I > I_{min}$), as the plasma decays, a balance is established between the decreased plasma loss and the rate of particle input to the plasma by ionization of the injected neutral beam, and a steady-state plasma density and temperature are established.

The high initial density of the laser produced target plasma makes the plasma opaque to the neutral injection beam during the earlier stages of the injection phase. During this time every incident energetic neutral in the beam that enters the laser produced plasma experiences either an ionization or a charge transfer collision. The magnetic field confines the neutral particles that become ionized. However, the large charge exchange cross section causes a large number of these neturals entering the laser produced plasma to experience a charge exchange transfer collision, whereby this large number of the neutrals become mirror confined as ions, while ions in the laser produced target plasma leave as neutrals in their place, In general, the resulting particles emanating from the target plasma are randomly directed and these particles must be rapidly pumped, e.g., on a cryogenically cooled gettering surface, so that they do not form a high density background ambient gas which would subsequently contaminate and degrade the confined plasma. At a later time when the confined plasma density approaches its steady-state value, the beam utilization is reduced, and the unused portion of the beam must be disposed of in a beam dump.

Figure 5:
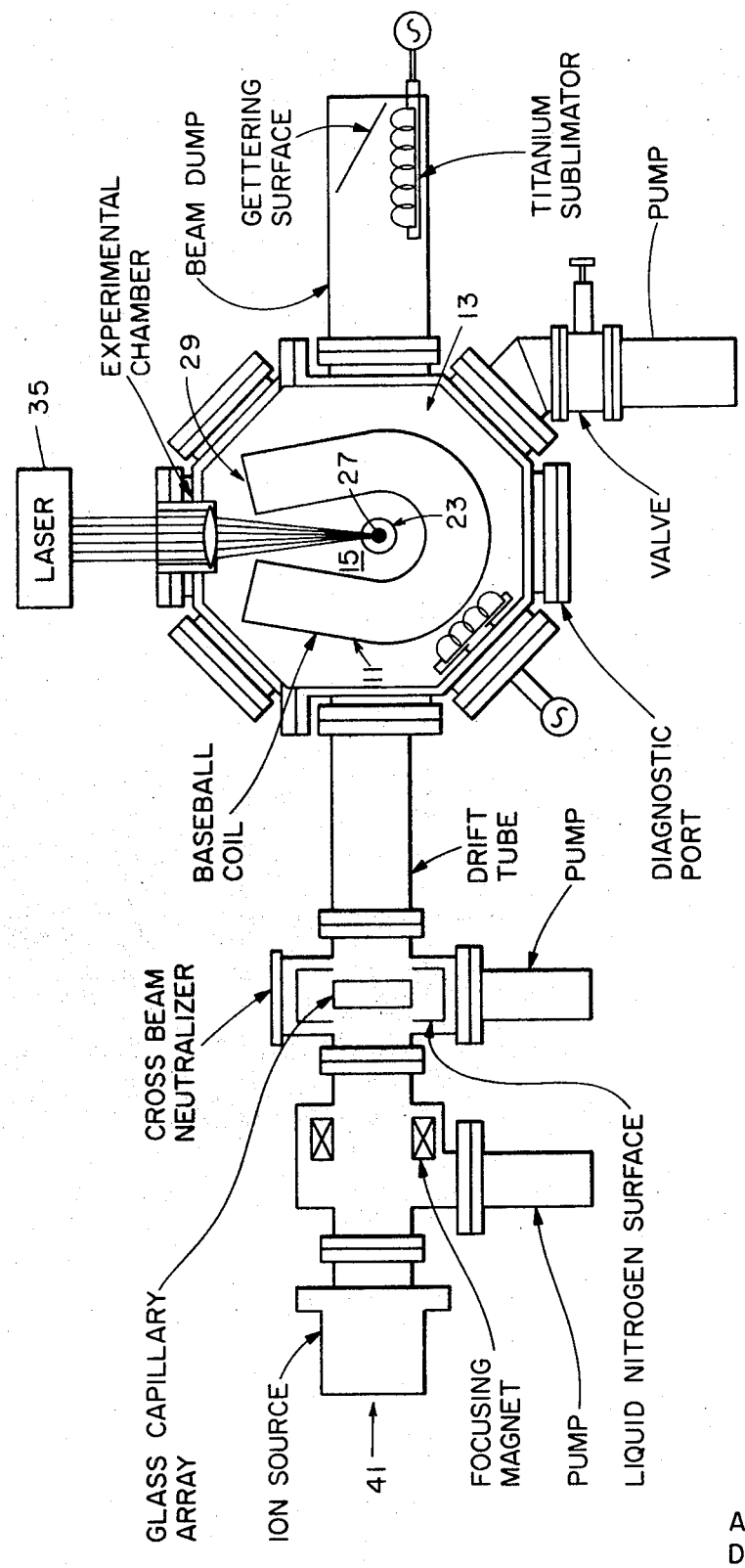
FIG. 5 is a schematic cross section of one embodiment of the hybrid laser plasma target system of this invention.

FIG. 5 shows one practical embodiment of this invention for producing the high temperature plasma, and comprises a laser 35 for producing the desired target plasma 33 in a static containment magnetic field 15, with a neutral beam injection source 41. The energetic neutral beam is injected onto the target plasma after its expansion has been stopped and the magnetic field has permeated the trapped plasma to establish a mirror confined plasma.

Figure 6A:
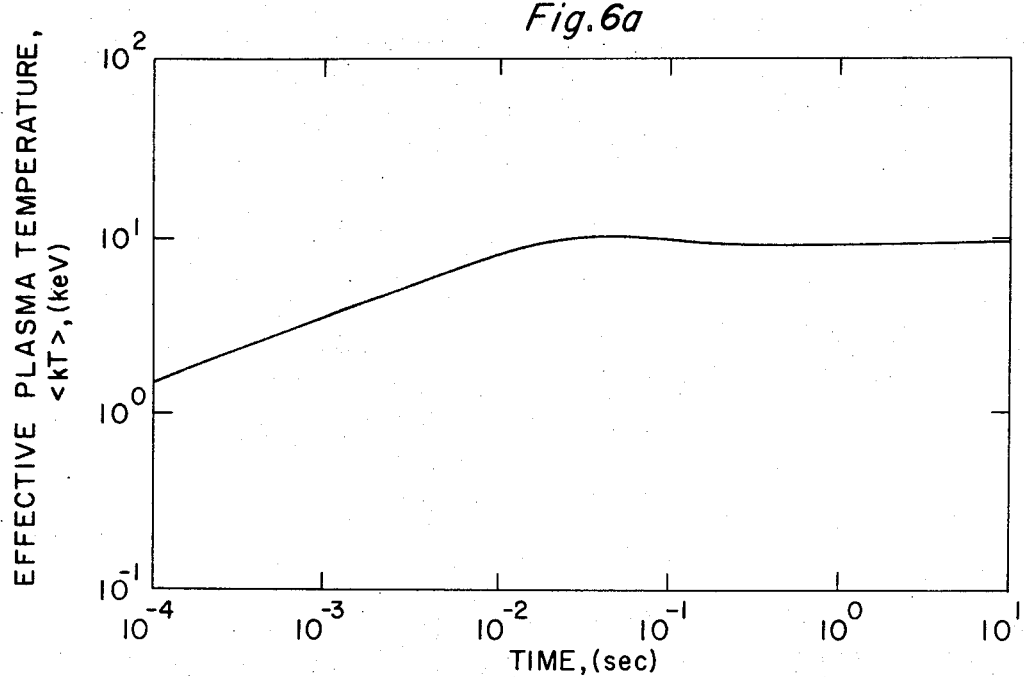
FIGS. 6A and 6B are graphic illustrations of the target plasma temperature and density of the apparatus of FIG. 5.
Figure 6B:
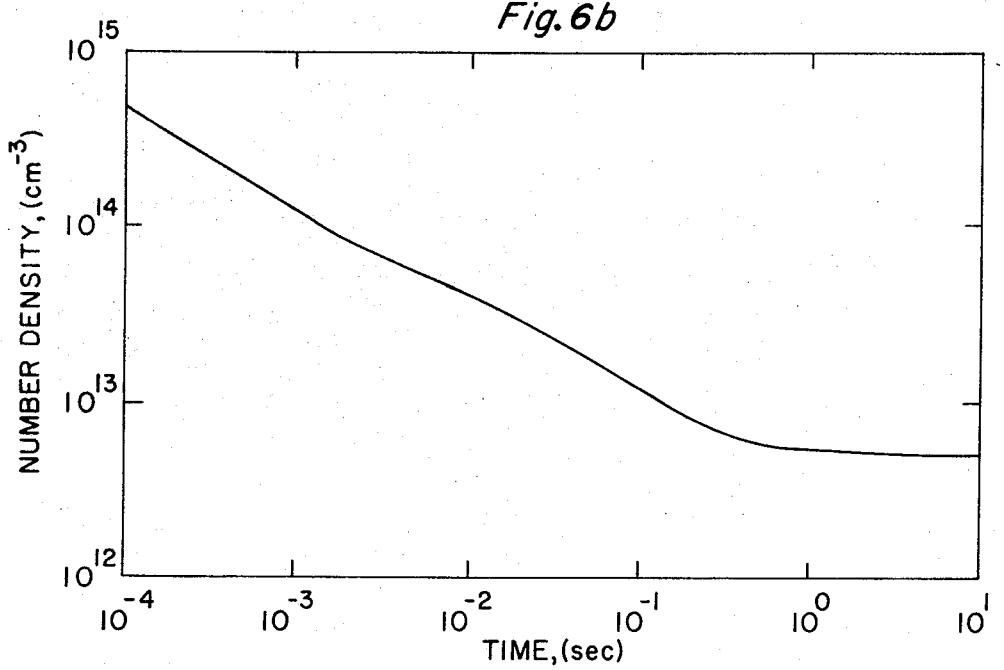

While the technique of this invention can be used to provide a steady-state high temperature plasma in a fusion reactor, an immediate utility of this invention is the generation of reactor plasma densities and temperatures in research reactors for the examination of fusion reactor plasma properties. In that regard, an application of the present invention in a research reactor is described below. The behavoir in time of the ion temperature and density of the target plasma are shown in FIGS. 6A and 6B for a laser produced intitial target plasma formed by laser heating of a 50 $\mu$ particle of LiH containing ~ $10^{16}$ lithium and hydrogen particles to an average energy of 0.5 keV. The laser produced plasma is formed in and expands within a 15 kG, mirror ratio and well depth of 2 minimum-B magnetic field with 21 cm between mirror points. The target plasma is irradiated by a 0.1 amp, 10 keV neutral hydrogen injection beam.

The initial rise in the contained plasma temperature is the result of scattering of low energy ions into the loss cones and from charge exchange with the 10 keV neutral beam. At the same time, the density decreases mainly as a result of scattering into the loss cones. The steady-state value of the plasma density for this example is reached at about 0.5 seconds. For the conditions considered here, nonadiabaticity losses are small compared with scattering losses. For the magnetic field parameters of this example, at beam energies above 15 keV, non-adiabatic losses dominates and, above 20kev, prevent the attainment of a steady state.

Charge exchange collisions occur not only between the injected neutral beam and the target plasma but also between the plasma ions and the neutral particles of the low pressure background of the vacuum system. This process substitutes the room temperature ion of the background gas for an energetic plasma ion. The cold ion is immediately scattered into the loss cones, while the energetic neutral easily escapes from the magnetic trap. The high density of the target plasma results in a shielding of the plasma interior, with the charge exchange loss occurring primarily at the plasma boundary. Taking account of this self-shielding effect, the maximum neutral background density consistent with maintenance of the plasma target can be determined.

Figure 7A:
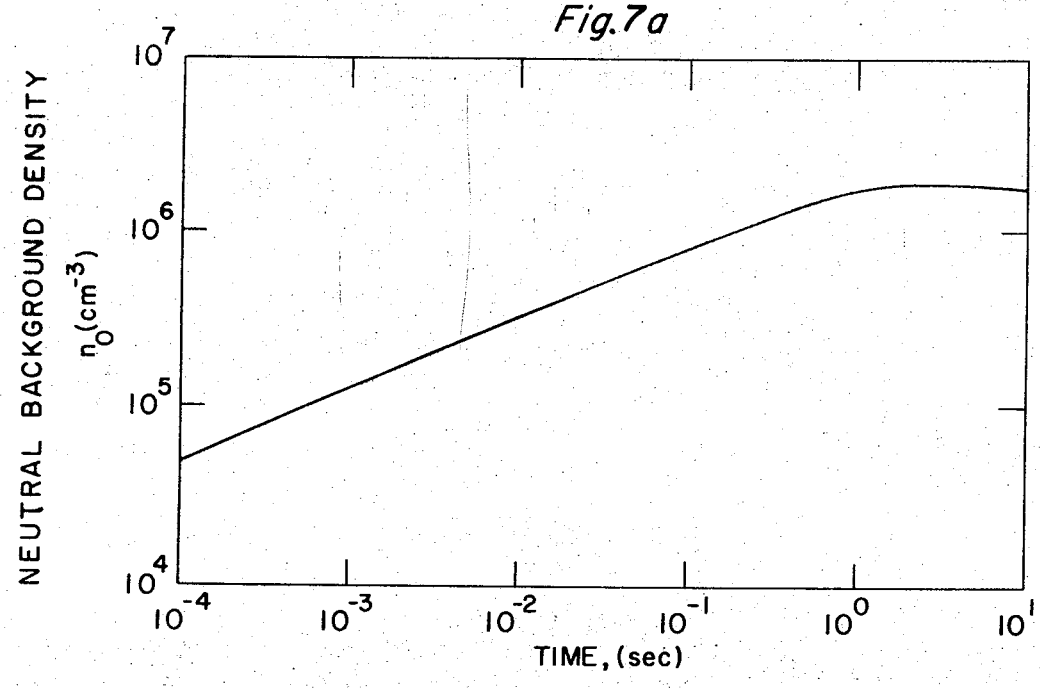
FIGS. 7A and 7B are graphic illustrations of the target plasma neutral and ion densities of the apparatus of FIG. 5.
Figure 7B:
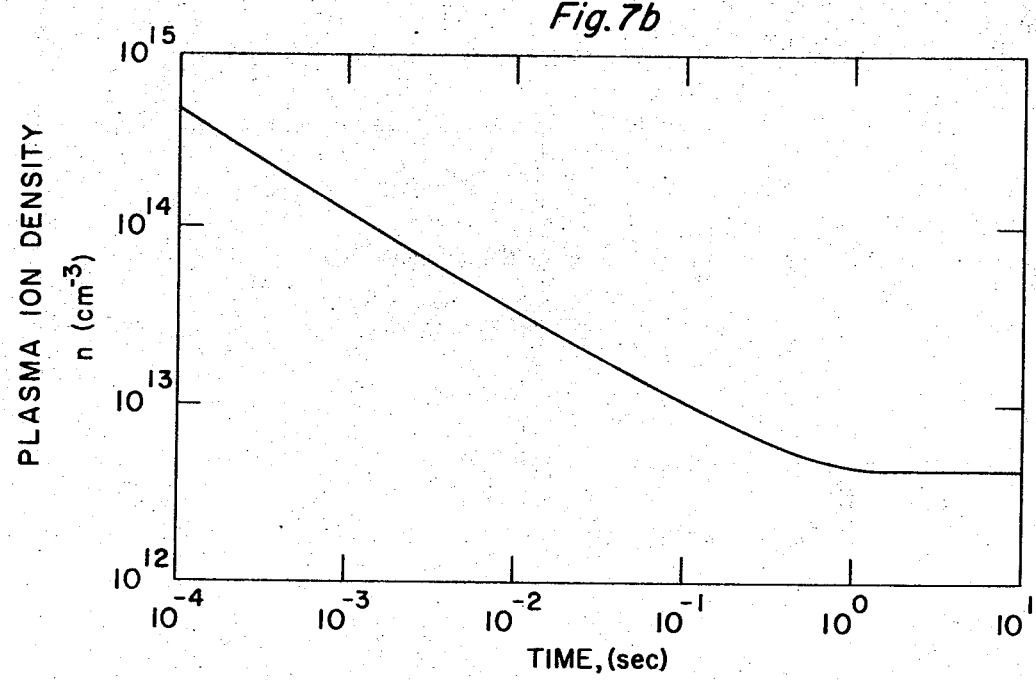

For the example research reactor considered here, a 10 keV, 0.1 amp neutral beam incident on a plasma with an initial average energy of 0.5 keV per particle and an initial density $n = 5 \times 10^{15}$ particles per cubic centimeter, the neutral and ion densities are shown in FIGS. 7A and 7B for a background neutral density $N_o = 10^8 cm^{-3}$ a plasma surface area S=220 cm$^2$, a volume V=160 cm$^3$, and a chord length l=8 centimeters. The neutral density in the plasma is reduced by charge exchange an ionization, and the subsequent slow decay of the ion density is caused by Coulomb scattering into the loss cones. In approaching steady state, the ion density closely approximates the equivalent case shown in FIG. 6B. The neutral density increases as the ion density decays and approaches a steady-state value.

In accordance with other embodiments of the described invention, it is understood that one or more of the described neutral beams of the same and/or more than one species selected from the group consisting of H, D, T and higher atomic number (Z) elements can be injected into the described or other like target plasmas from the same and/or more than one direction. For example, a neutral deuterium plus tritium beam may be injected into a target initially composed of deuterium confined in the described or other minimum-B, closed, open-ended, minimum average B, multipole, spherator, stellerator, tokamak,and/or any of the other magnetic field configurations which have been or might be used in a thermonuclear research reactors. In like regard, the described or other suitable conductors may be used for the windings of the coil for generating the magnetic field configurations for confining the described or like plasma targets, of H, D, T, D-T, or higher atomic number elements. The high density target plasma approach of the invention has the advantage that it can be utilized in any of a wide variety of magnetic fields, such as a minimum-B, average minimum-B, closed, or open-ended magnetic confinement field. Also, this invention has the advantage that the plasma can be produced by laser irradiation of a pellet of any of a wide variety of constituents having a high density, with the steady-state plasma composition determined solely by the atomic species of the neutral injection beam or beams.

Although the present invention has been described in a particular embodiment involving a laser produced initial target plasma and an open-ended minimum-B mirror magnetic containment field, it will be apparent to those skilled in the art that changes and modifications may be made in the details of construction and operation of this invention without departing from the scope of the invention as hereinafter claimed.

We claim:

1. Method for sequentially creating a plasma in a vacuum system having a neutral beam injection source of a neutral beam of neutral atomic hydrogen particles, comprising:
    a. generating a radially expanding ball of plasma by directing a Q-switched, lens focused, laser light beam in a first direction into an open-ended, baseball seam-shaped winding that produces a constant, open ended, minimum-B, mirror, vacuum magnetic field forming end-cusps and containing an electrically suspended up to 50μ diameter solid pellet of lithium deuteride having a number density of at least $10^{20}$ particles/cm$^3$, comprising at least $10^{16}$ lithium and hydrogen particles in the vacuum magnetic field at the focus of the lens where the pellet is vaporized, ionized and heated by the laser light beam to produce the radially expanding ball of plasma in the form of a continuum fluid in the surrounding vacuum that is provided in the vacuum system;
    b. magnetically confining said expanding ball of plasma in the open-ended minimum B, mirror vacuum magnetic field having end cusps so as to form a magnetically confined deuterium plasma of at least $10^{12}$ particles/cm$^3$ from which lithium ions preferentially escape, the plasma being adapted as a target to receive the neutral beam of neutral hydrogen particles; and thereafter
    c. injecting the neutral beam of neutral hydrogen particles into the plasma so confined for effecting the maintenance and heating of a steady state plasma, while producing particles emanating from the plasma so confined and rapidly pumping them so as to prevent a high density background ambient gas that would contaminate and degrade the confined plasma, said steps of generating and magnetically confining said deuterium plasma preceding said injecting step and effecting the randomization of the directed energy of expansion of the expanding plasma.

2. Method for sequentially creating a plasma in a vacuum system having a neutral beam injection source of 0.1 amp, 10 ke V, neutral, atomic hydrogen particles of average energy of 0.5 ke V per particle in a beam, comprising the steps of:
    a. producing a rapidly expanding localized ball of plasma within an open-ended baseball seam shaped winding for producing a constant, open-ended minimum-B, mirror, vacuum magnetic field within the vacuum system by directing Q-switched, lens focused, laser light beam in a first direction into an open end of the constant, open-ended, minimum B, mirror, vacuum magnetic field and against a solid 50 μ diameter particle of lithium deuteride that is electrically suspended therein, so as to form the expanding localized ball of plasma by vaporization, ionization and collisional heating of the solid 50 μ diameter particle of lithium deuteride that is electrically suspended within the vacuum system;
    b. capturing the expanding ball of plasma for confining the plasma as it expands within the vacuum magnetic field and, upon permeation of the plasma by the magnetic field, confining the plasma within the vacuum magnetic field at a particle number density of greater than $10^{12}$cm$^{-3}$, said vacuum magnetic field and confined plasma being adapted to receive the neutral beam of neutral hydrogen particles; and
    c. injecting the 0.1 amp, 10 ke V neutral hydrogen beam having an average energy of 0.5 ke V per particle into the plasma so confined to ionize the injected neutral beam and to heat the confined plasma so as to sustain it against decay, while producing particles. emenating from the confined plasma and pumping them so as to prevent a high density background ambient gas that would contaminate and degrade the confined plasma.

3. The method of claim 2 wherein the heating of the solid particle of lithium deuteride is produced first by the laser light beam, and ionization of the injected beam is effected after the step of capturing the expanding localized ball of plasma so as to achieve a steady state confined plasma at a density of at least $10^{12}$ cm$^{-3}$ in about 0.5 seconds.

4. The method of claim 2 wherein the expanding ball of plasma has a directed expansion energy produced by the step of laser light heating a solid particle of lithium deuteride having a number density of about $10^{16}$ lithium and hydrogen particles in the vacuum magnetic field, wherein the step of magnetically confining the expanding plasma effects the stable randomization of the confined plasma produced by the laser light heating of the solid particle of lithium deuteride and the confining of the expanding ball of plasma that results therefrom in the vacuum magnetic field.

5. The method of claim 1 wherein said injection step injects the neutral beam of neutral hydrogen particles so that said injection maintains the number density of the magnetically confined ball of plasma against decay between about $5 \times 9\ 10^{15}$ particles per cubic centimeter and $1 \times 10^{12}$ particles per cubic centimeter.

6. The method of claim 1 wherein the step of magnetically confining the expanding ball of plasma, comprises engergizing the open ended, minimum-B mirror, vacuum magnetic field with a predetermined capture volume around the position of the solid pellet of lithium deuteride for continuously receiving the neutral beam of neutral hydrogen particles after the laser beam generates the expanding ball of plasma by vaporization ionization and collisional heating of the solid particle constituents so that the laser produced expanding ball of plasma initially expands with a directed velocity relative to the pellet position in the predetermined capture volume around the solid pallet during the radiation thereof by the laser light beam, and maintaining the vacuum magnetic field while the ball of plasma expands therein so that at least a portion of the directed velocity of the expanding ball of plasma is stopped within the capture volume by the vacuum magnetic field for receiving the neutral beam of neutral hydrogen particles therein.

7. The method of claim 6 wherein the vacuum magnetic field is maintained constant in time at a strength sufficient to capture at least a portion of the expanding ball of plasma at a ratio $\beta$ of energy density of the laser produced plasma to that of the vacuum magnetic field so that the plasma is captured at $\beta \gtrsim 1$.

8. The method of claim 2 wherein the laser light heating of the solid particle of lithium deuteride causes the ball of plasma to expand with a Maxwellian velocity distribution function, and the step of magnetically capturing the expanding ball of plasma effects the randomizing of the expanding ball of plasma by the capture thereof within a magnetic capture volume formed by the vacuum magnetic field so that randomized Maxwellian velocity distribution results and contributes to the stable capture of the expanding ball of plasma.

9. The method of claim 2 wherein said expanding ball of plasma is captured by the step of producing the vacuum magnetic field at a strength around the solid particle of lithium deuteride during the laser light heating thereof sufficient so that the expanding ball of plasma is permeated by the vacuum magnetic field and the expanding ball of plasma is captured at a ratio $\beta$ of the energy density of the plasma to that of the vacuum magnetic field of $\beta < 1$ and at a density upon capture of greater than $1 \times 0\ 10^{12}\ cm^{-3}$.

10. The method of claim 9 wherein said plasma is used as a target for said neutral beam after said plasma is permeated by said magnetic field to produce said plasma at $\beta < 1$ and at a density upon said confinement greater than $1 \times 10^{12}\ cm^{-3}$ 11. The method of claim 10 wherein the neutral beam heats the plasma by charge exchange collisons to a temperature determined by the energy of the neutral beam.

12. The method of claim 11 wherein said change exchange collisions replace the constituent ions of the plasma with ionized atoms from the neutral beam during the injecting step.

13. The method of claim 2 wherein the injecting step injects a beam of atoms into the confined plasma with a velocity distribution function for effecting the ionization of the beam atoms in the confined plasma while the confined plasma is sufficiently collisional that said velocity distribution function is thermalized over the plasma velocity distribution function, thereby to inhibit the development of destructiveinstabilities in said plasma.

14. The method of claim 1 wherein said injecting step injects individual neutral beams of neutral atomic hydrogenparticles into the magnetically confined plasma, and said injecting step varies said neutral beams of neutral atomic hydrogen particles in time as to energy and intensity in accordance with the requirements of optimum plasma stability in the magnetically confined plasma for effecting the production and control thereof.

* * * * *